F. SCHULENBURG.
TRAP FOR CATCH BASINS.
APPLICATION FILED FEB. 7, 1914.
1,109,944.
Patented Sept. 8, 1914.
2 SHEETS—SHEET 2.
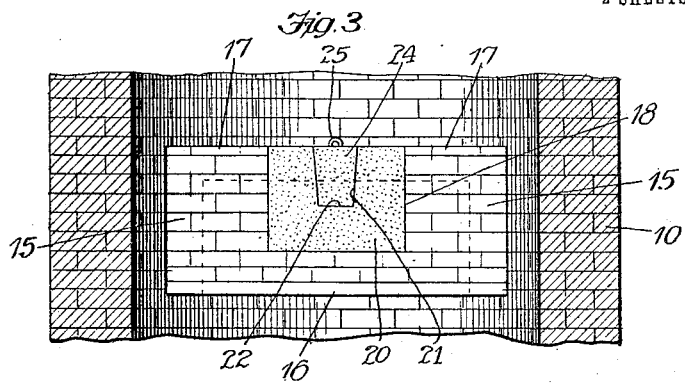
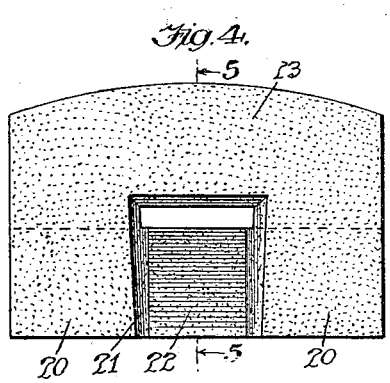
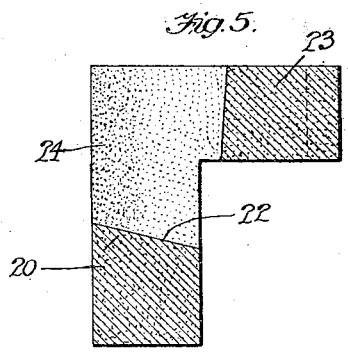
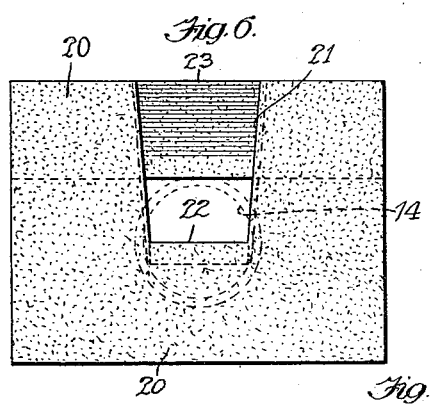
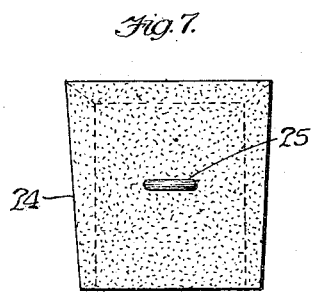
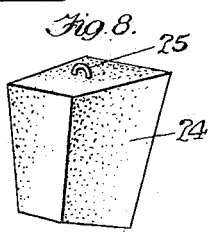
Witnesses
Martin H. Olsen.
A. S. Phillips.
Inventor
Fred Schulenburg
By Chas C. Tillman
Atty.

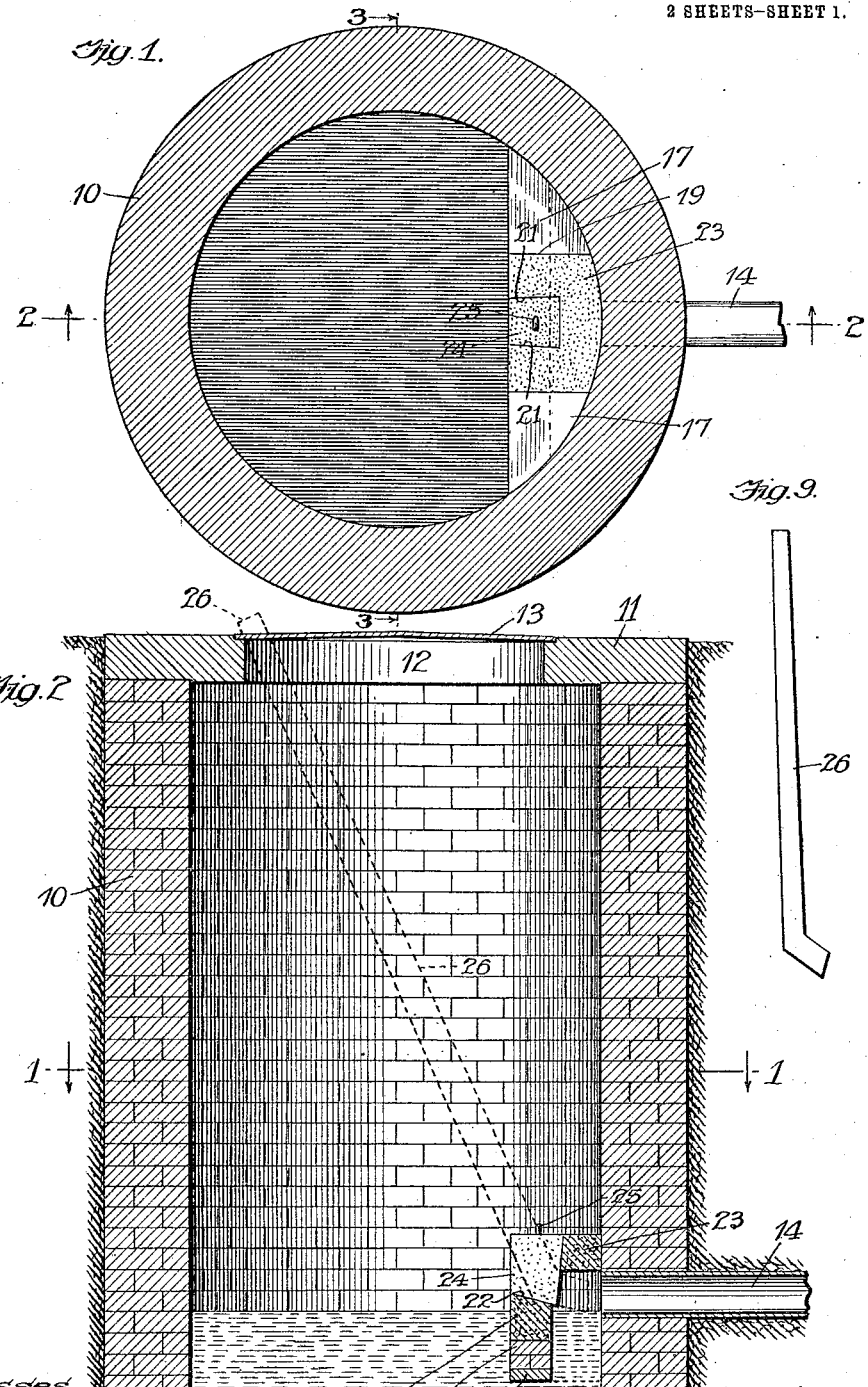

UNITED STATES PATENT OFFICE.

FRED SCHULENBURG, OF RIVER FOREST, ILLINOIS.

TRAP FOR CATCH-BASINS.

1,109,944.     Specification of Letters Patent.     Patented Sept. 8, 1914.

Application filed February 7, 1914. Serial No. 817,125.

*To all whom it may concern:*

Be it known that I, FRED SCHULENBURG, a citizen of the United States, residing at River Forest, in the county of Cook and State of Illinois, have invented certain new and useful Improvements in Traps for Catch-Basins; and it consists in certain peculiarities of the construction, novel arrangement, and operation of the various parts thereof, as will be hereinafter more fully set forth and specifically claimed.

As is well known to those skilled in the art to which my invention pertains, every catch-basin in a sewage system is equipped with a trap at the point where the outlet pipe of the catch-basin or small sewer-pipe leading to the main sewer, communicates with the catch-basin, and that these traps are almost always broken or removed, when it is necessary to clean or remove any obstructions from the outlet pipe of the basin, and are seldom if ever repaired or replaced. This injury to and removal of the old style traps, as well as, the neglect to repair or replace them, causes insanitary conditions, foul and offensive odors and sickness in the locality of the basins.

It is the principal object of my invention to provide a trap for catch-basins which shall be simple and inexpensive in construction, strong, durable and efficient in operation, and so made, that it can be readily opened, without entering the basin, in order to permit of the insertion of a sewer-rod or other suitable implement into the outlet pipe of the basin, for unclogging or clearing the same, after which the trap can be easily closed, thus rendering it and the catch-basin as effective and sanitary as originally, and without any expense for repairs or loss of time.

Other objects and advantages of the invention will be disclosed in the subjoined description and explanation.

In the accompanying drawings, which serve to illustrate the invention: Figure 1 is a plan sectional view taken on line 1—1 of Fig. 2, showing the catch-basin equipped with my improved trap therefor and the parts in their normal positions; Fig. 2 is a central vertical sectional view taken on line 2—2 of Fig. 1, looking in the direction indicated by the arrows, illustrating by dotted lines a guide which may be used for inserting the sewer-rod into the outlet of the catch-basin for the purpose of cleaning or removing obstructions from said outlet; Fig. 3 is a fragmental vertical sectional view taken on line 3—3 of Fig. 1, illustrating a face view of the trap; Fig. 4 is a greatly enlarged detached plan view of the key-seat block; Fig. 5 is a cross sectional view thereof taken on line 5—5 of Fig. 4; Fig. 6 is an enlarged face view of the key-seat block, showing it detached from the trap; Fig. 7 is a plan view of the key of the trap; Fig. 8 is a perspective view of said key, and Fig. 9 is a view in elevation of a guide piece or tube which may be used in connection with the invention.

Like numerals of reference refer to corresponding parts throughout the different views of the drawing:

The reference numeral 10 designates a catch-basin, which may be made of any suitable size, form and material, but preferably cylindrical in shape and of brick. The upper end of the basin 10 is closed by means of a cover 11, which is provided with an opening 12 through which access to the interior of the basin may be had and which opening may be closed by means of a cover or plate 13 of the ordinary or any well-known construction.

Communicating through the vertical wall of the basin 10, at any suitable distance above the bottom thereof is an outlet pipe or conduit 14, which leads to the main sewer (not shown). Encompassing the inner end of the outlet or conduit 14 is my improved trap, which includes a vertical wall 15, which by preference is made mainly of brick and supported at its lower portion on a horizontal support 16, which may be a wooden, iron or stone bar extended segmentally across the interior of the basin 10, and supported at its ends in or on the walls thereof; and a trap or horizontal wall 17 which, as is clearly shown in Figs. 1 and 3 of the drawings, is located above the upper portion of the inner end of the conduit 14, and closes the space between the wall 15 of the trap and the wall of the basin at the upper end of said space. The upper portion of the wall 15 is provided with a rectangular recess 18, and the central portion of the horizontal wall or top 17 of the trap is provided with a cut-out portion 19, which communicates with the recess 18, and extends to the wall of the basin on each side of the inner end of the outlet or conduit. Located in the recess 18, and in the cut-out portion 19 aforesaid, is a block 20, which is angular in cross section, and has in its inner portion a key-seat 21, which is tapered downwardly and terminates at its lower end directly in front of the center of the outlet or conduit 14, as is clearly shown in Figs. 2 and 6 of the drawings. The floor 22 of the key-seat or recess 21 is inclined from the inner surface of the block 20, as shown in Fig. 5, and the upper portion of said recess or key-seat extends through the horizontal portion 23 of the block 20, and has its walls downwardly and inwardly inclined, as will be clearly understood by reference to Figs. 4 and 5 of the drawings. Located in the key-seat 21 is a key 24, which is preferably trapeziform, or may be of other shape to fit within a suitably shaped key-seat should the latter be modified in form. Secured to the upper end of the key 24 is an eye or staple 25, with which a rod having a hook on one of its ends can be engaged when it is desired to remove the key 24 from the seat 21, or to place the key in position in said seat.

Should the outlet or conduit 14, leading from the catch-basin 10 to the main sewer become clogged, or should it be necessary to clean the same, the key 24 may be removed from the key-seat of the block 20, by lifting the said key through the instrumentality of a hooked-rod or instrument engaging the eye or staple 25, when it is apparent that the lower end of the guide 26, may be placed in the recess or key-seat 21 so as to occupy about the position shown by dotted lines in Fig. 2 of the drawings, when it is evident that a sewer-rod may be inserted through the guide 26 into the outlet 14, for the purpose of removing the obstruction therefrom, or for ascertaining the location of said obstruction. In using my improved trap, it is manifest that as the support 16 for the lower portion of the wall 15 of the trap is located at a distance from the bottom of the casing and that said wall is located at a distance from the wall of the casing, space will be provided through which water may pass from the basin out through the conduit 14 into the main sewer, but when the trap is closed by means of the key 24 offensive odors will be prevented entering the basin or escaping from the same.

By providing the vertical wall 15 and the covering 17, which constitutes the trap, with the recess 18 and cut-out portion 19, respectively, it is apparent that the angular block 20, having the key-seat 21 and the key 24 of a corresponding shape to fit said seat, which block and key may be made of cement and carried in stock by dealers in plumbing or sewage supplies, may be readily fitted for use in the said recess and cut-out portion of the trap, and that when it is necessary to remove the key 24 for the purpose of cleaning the conduit, this can be readily done by the means and in the manner above set forth. By this arrangement an improved article of manufacture, consisting of the block 20 and the key 24 is afforded, and it is obvious that said members may be placed and fitted in the recess and cut-out portion of the trap by an ordinary workman after the trap has been built. Furthermore, by reference to Figs. 2 and 3 of the drawings, it will be seen that the recess 18 in the wall 15 of the trap has its lower portion located a considerable distance below the lower surface of the outlet conduit 14, so that in the event of said conduit becoming so clogged that the obstruction cannot be removed, by removing the key 24 and inserting a sewer rod through the opening in the block 20 and into the conduit, the said block can be removed from the wall 15 and covering 17 in order to enable a person to enter the catch basin and operate with suitable instruments through the recess 18 to remove the obstruction from the conduit, thus affording the operator more room to properly clean the conduit and trap than if the block 20, with the comparatively small opening therein for the key, were in place.

Having thus fully described my invention, what I claim and desire to secure by Letters Patent, is—

1. The combination with a catch-basin, of an outlet conduit leading from the basin at a distance above the bottom thereof, a trap consisting of a vertical wall supported within and on the walls of the basin at a distance from the bottom of the basin and at a distance from the inner end of said conduit and having a rectangular opening in its upper portion, a cover extended from the upper portion of said wall to the wall of the casing above the conduit and having a rectangular opening in communication with the opening in said wall, an angular block having in its angle between the side edges of the block an opening provided with downwardly inclined walls, and a key removably located in said opening and formed to fit the same.

2. The combination wtih a catch basin, of an outlet conduit leading from the basin at a distance above the bottom thereof, a trap consisting of a vertical wall supported within and on the walls of the basin at a distance from the bottom of the basin and at a distance from the inner end of said conduit and having a downwardly extended opening in its upper portion, a cover extended from the upper portion of said wall to the wall of the casing above the conduit and having an opening in communication with the opening in said wall, a block having between its side edges an opening provided with downwardly inclined walls, and a key removably located in the last named opening and formed to fit the same.

3. The combination with a cylindrical catch basin, of an outlet conduit leading therefrom at a distance above its bottom, a segmental trap supported within and on the wall of the basin with its lower edge at a distance from the bottom thereof and with its upper portion located above the inner end of the conduit, said trap having in its upper portion a tapered opening extended at its lower end below the upper surface of the conduit, and a downwardly tapered key removably located in said opening.

FRED SCHULENBURG.

Witnesses:
CHAS. C. TILLMAN,
A. S. PHILLIPS.

Copies of this patent may be obtained for five cents each, by addressing the "Commissioner of Patents, Washington, D. C."